June 2, 1964  J. H. MILLER ETAL  3,135,814
METHOD FOR MOLDING HOLLOW PLASTIC PRODUCTS
Filed July 12, 1960  3 Sheets-Sheet 1
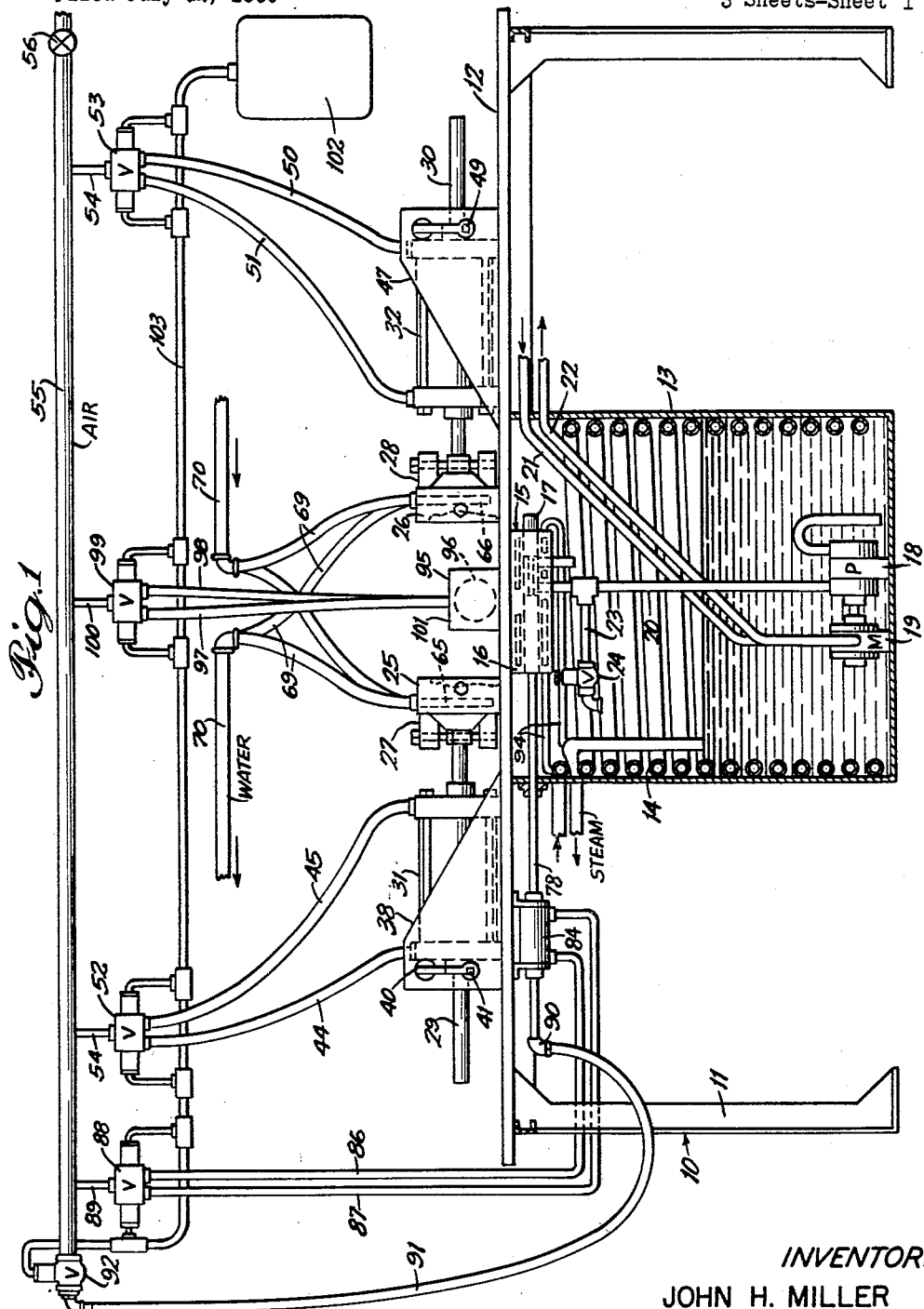
INVENTORS.
JOHN H. MILLER
MILLARD O. HELMS
BY Dawson, Tilton, Fallon & Lungmus,
ATTORNEYS.

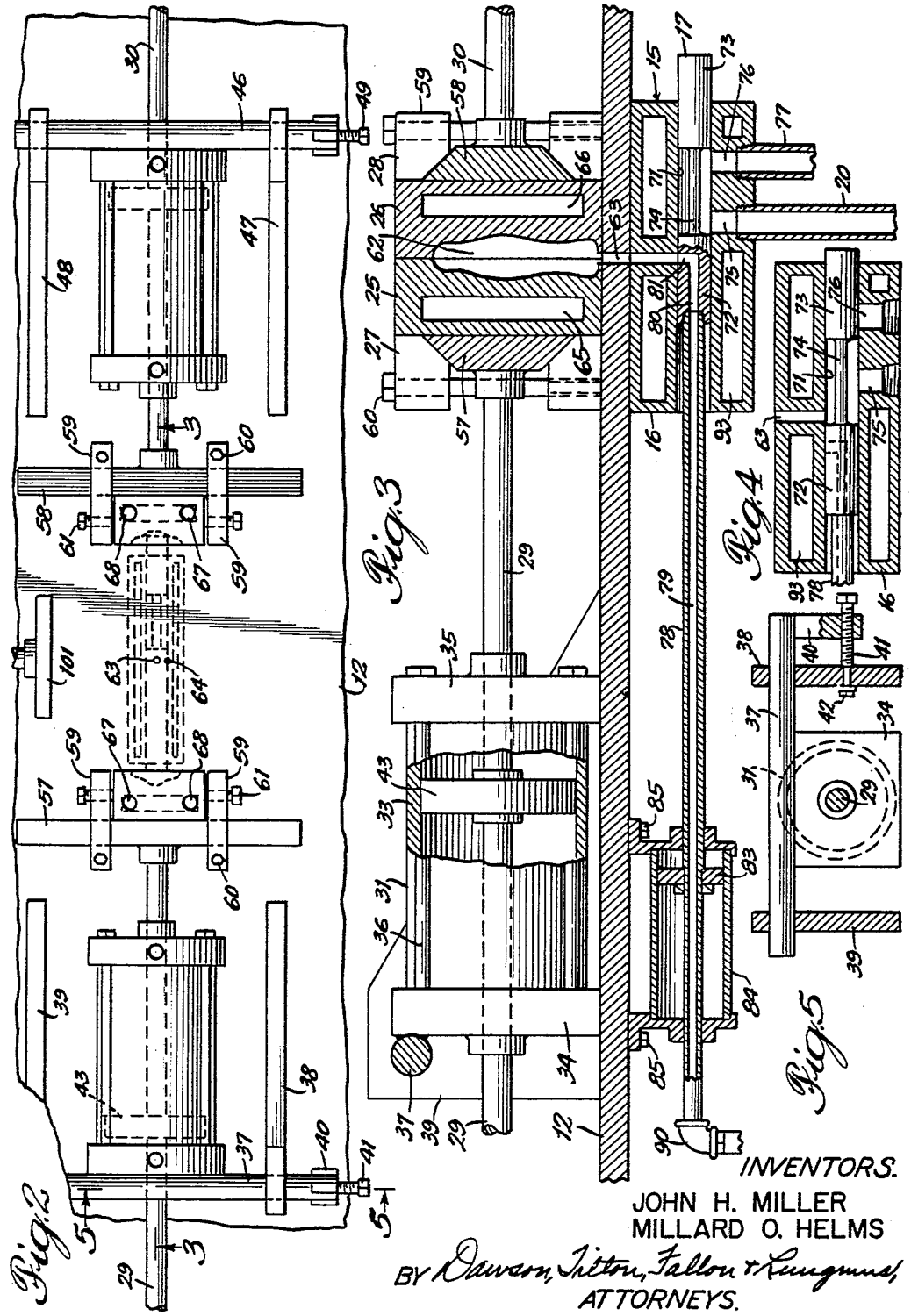

June 2, 1964    J. H. MILLER ETAL    3,135,814
METHOD FOR MOLDING HOLLOW PLASTIC PRODUCTS
Filed July 12, 1960    3 Sheets-Sheet 3
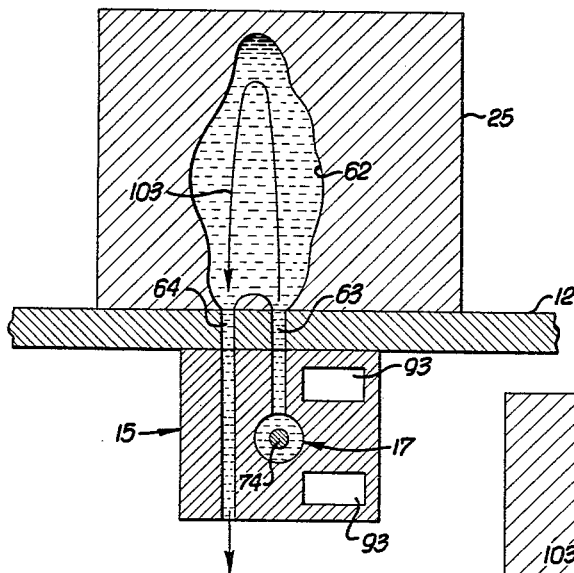
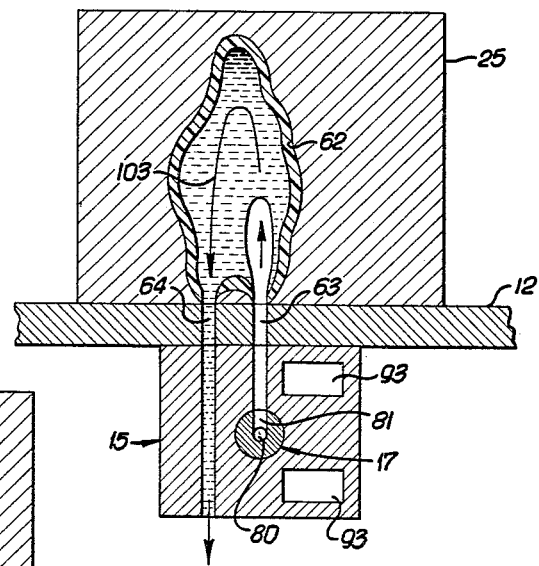
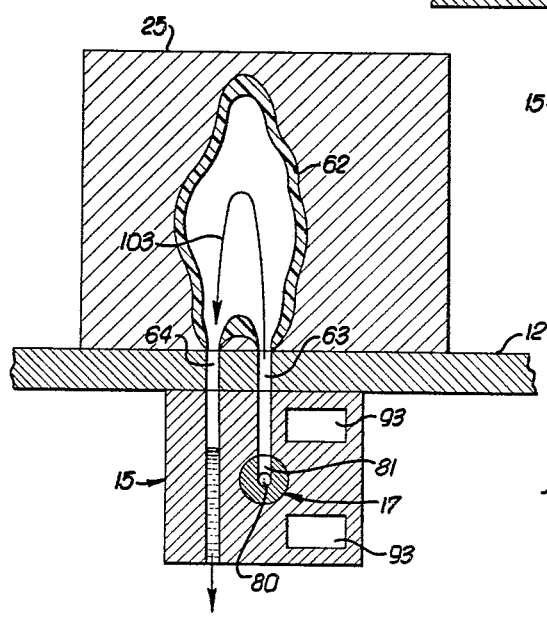
JOHN H. MILLER
MILLARD O. HELMS
INVENTORS.
BY Huebner & Worrel
ATTORNEYS.

United States Patent Office 3,135,814
Patented June 2, 1964

3,135,814
METHOD FOR MOLDING HOLLOW
PLASTIC PRODUCTS
John H. Miller, Hollywood, and Millard O. Helms,
Sepulveda, Calif., assignors, by mesne assignments, to
Mold-A-Rama, Inc., Los Angeles, Calif., a corporation
of California
Filed July 12, 1960, Ser. No. 47,340
3 Claims. (Cl. 264—301)

This invention relates to a method for quickly and accurately molding a quantity of hollow plastic products such as plastic figures, toys and the like.

The present application is a continuation-in-part of co-pending application 685,261, filed September 20, 1957, now abandoned, and is related to co-pending application Serial No. 11,605, filed February 29, 1960, which was a division of Serial No. 685,261 and which is now Patent No. 3,068,518, granted December 18, 1962.

An object of the present invention is to provide a method wherein a molten thermoplastic material is forced, under pressure, through the cavity of a mold and is then followed by a blast of compressed air which forces the core of molten plastic from the cavity leaving a wall of solidified plastic against the mold surfaces. The forced flow of molten plastic "through" the cavity means that the fluid plastic enters an inlet opening, impinges on the inner surfaces of the mold and then, without interruption in the continuity of the stream, passes out through a separate outlet opening, some of the material, as it travels through the mold cavity, congealing on the cool inner surfaces of that cavity. A further object is to provide a method which may be easily adapted for molding large quantities of plastic products of different size and shape. A still further object is to provide a method particularly suited for high speed molding operations wherein molds formed from relatively low strength materials may be used because of the relatively low internal pressures arising during the operation.

Other objects will appear from the specification and drawings in which:

FIGURE 1 is a broken front elevation of an apparatus which may be employed in practicing the method of the present invention; FIGURE 2 is a broken top plan view showing structural details of the apparatus; FIGURE 3 is an enlarged front elevation of the apparatus shown partly in section and taken along line 3—3 of FIGURE 2; FIGURE 4 is a vertical sectional view of the valve assembly similar to the valve assembly shown in FIGURE 3 but illustrating the valve member in a different position; and FIGURE 5 is a vertical sectional view taken along line 5—5 of FIGURE 2.

FIGURE 6 is an enlarged cross sectional view in the direction of the face of mold section 25 when viewed as in FIGURE 3, but with the valve member in the position shown in FIGURE 4. FIGURE 6 illustrates molten thermoplastic material flowing into the mold cavity from the inflow passage 63 and out from the mold cavity through outflow passage 64.

FIGURE 7 is similar to FIGURE 6 but illustrates a succeeding step in the method. A layer of plastic material has congealed upon the relatively cool walls of the mold cavity and compressed air is being introduced through the inflow passage 63 to blow the thermoplastic material which remains molten out of the cavity and down through the outflow passage 64.

FIGURE 8 illustrates a successive stage in the method, being a continuation of the stage or step illustrated in FIGURE 7, all of the molten material in the center of the cavity which has not congealed or hardened has been forced outwardly by the compressed air and is in the final stages of return through passage 64 to the thermoplastic supply tank or other suitable exhaust area. The direction of flow of plastic and air is the same in all three views, FIGURES 6–8, as illustrated by the arrows 103.

Inasmuch as this case is derived from Serial No. 685,261, and the method may be performed by the intended use of the apparatus disclosed, although such apparatus is not the only equipment by which the method may be practiced, reference to the apparatus and its operation will follow next.

Referring to FIGURE 1 of the drawings, the numeral 10 generally designates a frame having support legs 11 and a generally horizontal platform 12. Beneath the platform is a tank 13 which serves as a reservoir for a molten thermoplastic material such as liquid polyethylene. The interior of the tank is lined with a spiral steam conduit 14 for maintaining the plastic material in a molten state. The steam jacket or conduit may be connected to any suitable source of steam (not shown).

Beneath platform 12 and within the confines of tank 13 there is a valve assembly generally designated by the numeral 15. This assembly essentially comprises a valve casing 16 and a movable valve member 17. It will be noted that the valve assembly is supported from the platform well above the level of molten plastic material within tank 13. A pump 18 powered by motor 19 drives molten plastic material from the reservoir to the valve assembly through conduit 20. Both the pump and the motor may be immersed within the mass of molten plastic and as shown in FIGURE 1 the motor may be operated by compressed air or other fluid carried by pipes 21 and 22. If desired, a bleed conduit 23, equipped with an adjustable valve 24 may be interposed between the pump and the valve assembly and along conduit 20 for regulating the flow of plastic material to assembly 15.

In the illustration given a pair of mold sections 25 and 26 are movably supported upon the upper surface of platform 12 above tank 13. Clamping assemblies 27 and 28 connect the respective mold sections to horizontal piston shafts 29 and 30. These shafts extend through cylinders 31 and 32 respectively.

As shown in FIGURE 3, cylinder 31 has a cylindrical side wall 33 and a pair of end plates 34 and 35 secured thereto by means of bolts 36. The outer end plate 34 is welded or otherwise secured to a horizontal shaft 37 which extends in a direction transverse to the axis of the piston shaft 29. Opposite end portions of the transverse shaft extend through vertical mounting plates or members 38 and 39 disposed on opposite sides of the cylinder. The parallel plates 38 and 39 may be welded upon platform 12 or may be rigidly secured thereto in any other suitable manner.

Since the transverse shaft is slidably received by plates 38 and 39, lateral adjustment of the piston cylinder and shaft may be accomplished by shifting the position of shaft 37 with reference to the mounting plates. As shown most clearly in FIGURE 5, shaft 37 is equipped with a depending arm 40 which has a threaded horizontal bore adapted to threadedly receive adjustment screw 41. One end of the adjustment screw projects through an opening in plate 38 and is freely rotatable therein. However, the enlarged end 42 of the screw restricts its longitudinal movement relative to the mounting plate. Therefore, upon rotation of the adjustment screw, the piston cylinder 31 and shaft 29 are shifted laterally between the vertical mounting plates.

In FIGURE 3 it will be seen that shaft 29 is equipped with a piston 43 which slidably engages the inner surface of cylinder wall 33. As compressed air or other fluid flows into the outer portion of the cylindrical chamber from conduit 44 (FIGURE 1), piston 43 is forced inwardly along with shaft 29 and mold section 25, and the mold section is moved into a first position directly above valve assembly 15 (FIGURE 3). On the other hand, when the compressed air is forced into the opposite end of the cylinder through conduit 45 the movable mold section is shifted to a second or retracted position (FIGURES 1 and 2).

Like piston cylinder 31, cylinder 32 is provided with a transverse shaft 46 slidably carried by mounting plates 47 and 48. Adjustment means 49 is identical in structure and operation to the depending arm 40 and threaded screw 41 which had been previously described. Since the structure and operation of the opposing piston assemblies are identical, a more detailed description of the structure of cylinder 32 is believed unnecessary herein. When compressed air passes through conduit 50 into the outer end portion of cylinder 32, shaft 30 moves inwardly and carries mold section 26 into a first position above the valve assembly. Mold section 26 is returned to its original or second position when air is forced into the opposite end of the cylinder through hose 51. Hence, the two piston assemblies work in opposition, the two mold sections 25 and 26 having their opposing vertical surfaces in contact with each other when each of the sections is in its first position, and being spaced from each other, as shown in FIGURE 3, when each of the sections is in its second or retracted position.

Referring to FIGURE 1 the paired air supply conduits for each piston cylinder are connected to solenoid-operated valves 52 and 53 respectively. The solenoid valves are in turn connected by pipes 54 to a manifold 55 which extends from a suitable source of compressed air or other pressure fluid (not shown). If desired, manifold 55 may be provided with a shut-off valve 56.

In the illustration given the mold support structures 27 and 28 are adjustable to accommodate mold sections of various sizes.

As illustrated most clearly in FIGURE 3, the opposing surfaces of the mold sections have complementary recesses which together define a cavity 62, when the opposing surfaces are in contiguous relation. Cavity 62 is completely closed except for lower inlet and outlet openings provided by one or both of the mold sections which communicate with inflow and outflow passages 63 and 64 provided in platform 12 and valve casing 16. While we have shown only a pair of such passages in the drawings, it will be understood that a greater number may be utilized depending upon the size and shape of the plastic product to be formed.

To maintain the mold sections at the reduced temperature required for proper solidification of a portion of the molten plastic material passing through cavity 62 during operation of the apparatus, we provide each of the sections 25 and 26 with flow passages 65 and 66. These passages or chambers are provided with inlet and outlet openings 67 and 68 respectively, and a coolant such as cold water is carried into and out of these chambers by flexible hoses 69 and conduits 70, as shown in FIGURE 1. In this manner, coolant is circulated through the mold sections and the sections are maintained at a suitable and uniform temperature.

Referring to FIGURES 3 and 4, it will be observed that the valve casing 16 has a cylindrical bore 71 extending therethrough and that the valve member 17 is slidable between two positions within that bore. Valve 17 is generally dumbbell shaped; that is, it has enlarged cylindrical end portions 72, 73 and an intermediate portion 74 of reduced diameter. A pair of openings 75 and 76 extend through the casing wall and communicate with bore 71 at different points along its longitudinal extent. It will be noted that the length of intermediate portion 74 is at least as great as the distance between spaced openings 75 and 76. The casing wall about opening 75 is threaded for threadedly receiving the upper end portion of conduit 20, the lower portion of that conduit being connected to pump 18 within tank 13. If desired, the casing wall about opening 76 may be similarly threaded to receive fitting 77.

One of the end portions of the valve member, end portion 72, is threadedly connected to a shaft 78 which is axially aligned with the valve member and with bore 71. Shaft 78 is provided with a longitudinal flow passage 79 extending therethrough and this flow passage is in direct communication with a flow passage provided by the enlarged portion or head 72. As shown most clearly in FIGURE 3, the flow passage of head 72 comprises an axial portion 80 which is aligned with the axial passage of shaft 78 and a transverse portion 81 which is aligned with the flow passage 63 extending upwardly through the valve casing and platform 12 when both of the openings 75 and 76 communicate with the annular space extending about the intermediate portion of the valve member. A piston 83 is fixed upon shaft 78 adjacent the opposite end thereof and this piston is disposed with a cylinder 84 which is rigidly secured by bolts 85 or by any other suitable means to the underside of platform 12. The piston is reciprocated within the cylinder by compressed air carried by conduits 86 and 87 extending from solenoid valve 88. The solenoid valve is in turn connected to manifold 55 by pipe 89 (FIGURE 1).

At its outermost end, the tubular shaft 78 is connected by fitting 90 to one end of a flexible tube or hose 91. The other end of that hose is connected to a solenoid-operated valve 92 attached to manifold 55. Hence, when valve 92 is in open position, compressed air may flow from the manifold through hose 92 and tubular shaft 78 to valve head 72. It will be noted, therefore, that shaft 78 not only functions as a piston shaft for reciprocating the slidable valve member 17 but also serves as a conduit for delivering compressed air to the vertical inflow passage 63 and to the cavity defined by the complementary mold sections.

To prevent solidification of plastic material within the valve casing, we have provided the casing with a steam chamber or compartment 93 for the circulation of steam through the casing and about bore 71. Pipes 94 extend from the steam chamber of the valve casing (FIGURE 1) and may be connected to the same conduits which carry steam to and from the heating coil lining the interior of tank 13.

Referring to FIGURES 1 and 2, it will be seen that means are provided for pushing plastic products formed by the mold sections off of the platform 12 where they may then be collected in any suitable receptacle (not shown).

From the foregoing, it is believed apparent that the operation of the apparatus depends upon the flow of compressed air or other fluid to the several piston cylinders and that this air flow is in turn controlled by the solenoid valves associated with the respective piston assemblies. A timer, diagrammatically illustrated in FIGURE 1 and designated by numeral 102, is electrically connected through branched conduit 103 to the solenoids of valves 52, 53, 88, 92 and 99 and controls the sequential operation of these electrically actuated valves. Since such timers are well known in the art, a detailed description of its construction and the electrical circuit involved is believed unnecessary for purposes of disclosing the present invention.

In the operation of the embodiment shown in the drawings and described above, pump 18 directs a continuous flow of molten plastic material upwardly through pipe 20 and into the valve casing. The amount of molten plastic flowing into the valve casing 16 through opening 75 may be varied by manually adjusting the by-pass valve 24. When the valve member 17 is in the position shown in FIGURES 1, 2 and 3, the liquid plastic flows into the portion of the bore disposed between the ended portions or heads 72 and 73 of the valve member and returns to the reservoir through opening 76. Steam circuating within the chamber or passage 93 of the valve casing maintains the casing at a sufficiently high temperature to prevent solidification of the plastic material.

At the commencement of each cycle of operation the movable parts of the apparatus are in the respective positions shown in FIGURE 1. Electrically operated valve 92 is closed, thereby preventing the flow of compressed air to valve assembly 15. Timer 102 first switches the solenoids of valves 52 and 53 so that compressed air passes into the outer or remote ends of cylinders 31 and 32 and drives the mold sections 25 and 26 into engagement directly above the valve assembly 15. After the opposing surfaces of the mold sections are in contiguous relation (FIGURE 3), valve 88 is electrically actuated to permit the flow of compressed air through conduit 87 and into piston cylinder 84. Valve 17 is thereby shifted into "first" position wherein end portions 73 seals off opening 76 and opening 75 is placed into direct communication with passage 63 extending upwardly through the valve casing and platform 12 (FIGURE 4). Since the flow of liquid plastic is no longer by-passed through opening 76 it passes upwardly through bore 71, passage 63 and through the mold cavity 62. Specifically, the molten plastic enters the mold cavity through inlet passage 63, streams through the mold cavity and then passes out of that cavity through outlet passage 64.

As the molten plastic streams through the mold cavity some of it tends to congeal against the relatively cool inner surfaces of the mold. After a selected amount of plastic has solidified on the inner walls of the mold, valve 88 is again electrically actuated to reverse the flow of compressed air into cylinder 84 and to move the valve member or body into the second position shown in FIGURE 3. At the same time, valve 92 is electrically opened, thereby permitting compressed air to flow through the tubular piston shaft 78 and through the aligned passages of the valve member and valve casing. The blast of air upwardly through inlet passage 63 and through the mold cavity 62 in the same direction of flow as the preceding stream of liquid plastic drives out any residual amount of molten plastic through outlet passage 64 and back into the tank 13, thereby leaving a layer of hardened plastic material against the cool surfaces defining the mold cavity. Valve 92 then closes to interrupt the flow of air through the mold cavity and solenoid valves 52 and 53 are electrically actuated to reverse the flow of compressed air to piston cylinders 31 and 32. After the mold sections have been shifted into retracted positions, the solenoid-controlled air-operated piston assembly 95 drives the pusher member 101 forwardly to sweep the hollow molded product off of the platform 12 and into a suitable receptacle. When the pusher member has again returned to its original position, the operating cycle is completed. The above-described steps are then repeated to form any desired number of hollow plastic products quickly and automatically.

In contrast to prior molding methods, such as injection molding techniques, the molten plastic simply flows through cavity 62 and out of the cavity's outlet with relatively little resistance. As a result, the mold may be formed from aluminum or from relatively soft or frangible metals or other materials. This is in sharp contrast to injection molding practice in which a mold cavity is filled with material and where the mold itself must be capable of withstanding internal pressures of considerable magnitude.

The thickness of the plastic layer solidifying upon the inner surfaces of the mold depends to a large extent on the duration of the plastic flowing step, as electrically controlled by timer 102, or by any suitable manually controlled means. Other factors are the properties of the plastic material, the temperatures of the plastic and the mold, the size of the mold and the rate of flow of the molten material. Also, the wall thickness of the final plastic product is affected by the temperature and particularly the force of the air stream which passes through the product prior to separation of the mold sections. However, with all other factors constant, it has been found that the wall thickness of the final hollow plastic product may be effectively controlled by regulating the duration of the plastic flowing step. It has also been found that with any given set of conditions a maximum thickness level is reached despite further increases in the duration of plastic flow because of the fact that the heat of the plastic traveling through the cavity counteracts the congealing effect produced by the relatively cool walls of the mold cavity.

While in the foregoing we have disclosed the present invention in considerable detail for the purpose of illustrating an embodiment thereof, it will be understood that many of these details may be varied considerably without departing from the spirit and scope of the invention.

We claim:
1. In a method for forming hollow thermoplastic products in a mold cavity having an inlet and a separate outlet, the steps of directing a stream of molten plastic material in one direction through said cavity from said inlet to said outlet while maintaining the internal surfaces of said mold at a temperature lower than the melting temperature of said thermoplastic material, continuing the flow of plastic material through said mold cavity from said inlet to said outlet until a plastic layer of predetermined thickness has congealed upon the inner surfaces of said mold, and flushing out residual molten plastic material within said mold cavity.

2. In a method for molding hollow products of thermoplastic material between a pair of mold sections defining a cavity having an inlet and a separate outlet, the steps of cooling the mold sections substantially below the melting temperature of said thermoplastic material, forcing molten thermoplastic material in one direction and in a continuous stream through said mold cavity from said inlet to said outlet, discontinuing the flow of molten plastic through said cavity after a selected amount thereof has solidified on the walls of said cavity, and immediately thereafter forcing compressed air through said cavity from said inlet to said outlet to flush the core of molten plastic material out through said outlet.

3. In a method for molding hollow products of thermoplastic material in a mold cavity having an inlet and a separate outlet, the steps of directing a stream of molten plastic material in one direction through said mold cavity from said inlet to said outlet while maintaining the internal surfaces of said mold at a lower temperature than the melting temperature of said plastic, discontinuing the flow of molten plastic through said cavity after a selected amount thereof has solidified on the internal surfaces of said mold, and immediately thereafter forcing compressed air through said cavity from said inlet to said outlet to flush out the core of molten plastic material therein.

References Cited in the file of this patent

UNITED STATES PATENTS

| | | |
|---|---|---|
| 1,949,502 | Szegvari | Mar. 6, 1934 |
| 2,209,877 | Ferngren | July 30, 1940 |
| 2,885,733 | Chupa | May 12, 1959 |
| 2,935,765 | Ciampolini | May 10, 1960 |
| 3,011,214 | Tollar et al. | Dec. 5, 1961 |

FOREIGN PATENTS

| | | |
|---|---|---|
| 567,012 | Great Britain | Jan. 24, 1945 |
| 1,145,441 | France | May 6, 1957 |

OTHER REFERENCES

"How to Slush Mold Polyethylene," from Modern Plastics, May 1958, pages 112–114.